Figure 1:
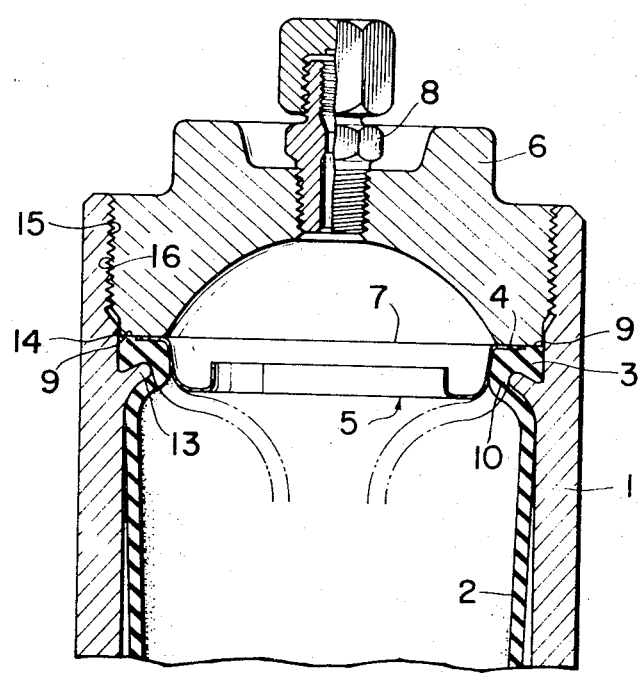

United States Patent [19]
Taki

[11] 3,788,358
[45] Jan. 29, 1974

[54] DEVICE FOR MOUNTING A BLADDER IN AN ACCUMULATOR

[75] Inventor: Hiroaki Taki, Shimizu, Japan

[73] Assignee: Nippon Accumulator Kabushiki Kaisha, Shimizu-shi, Japan

[22] Filed: Mar. 22, 1972

[21] Appl. No.: 236,927

[30] Foreign Application Priority Data
Mar. 30, 1971 Japan.............................. 46/22685

[52] U.S. Cl. ................................................ 138/30
[51] Int. Cl. .............................................. F16l 55/04
[58] Field of Search......................... 138/30; 73/395

[56] References Cited
UNITED STATES PATENTS
3,654,964 4/1972 Mercier et al. ........................ 138/30
3,113,592 12/1963 Mercier ................................ 138/30

*Primary Examiner*—Jerry W. Myracle
*Attorney, Agent, or Firm*—D. Paul Weaver

[57] ABSTRACT

On an upper surface of a flange portion formed along an outer periphery of a mouth of a bladder, is disposed an antifriction washer portion of a centering ring member, on which antifriction washer portion is placed a lid for an outer shell, and said flange portion is urged against said outer shell by turning said lid. The arrangement is such that no torque is imposed to the flange portion even when said lid is turned. An arcuated portion is formed in the centering ring member, so that the bend portion of the bladder may be deformed along this arcuated portion, and thereby locally sharp bending of the bladder can be avoided. Then, a slight gap clearance formed between the inner surface of the outer shell and the outer peripheral surface of the lid is tightly sealed by said flange portion.

1 Claim, 5 Drawing Figures

DEVICE FOR MOUNTING A BLADDER IN AN ACCUMULATOR

The present invention relates to improvements in a device for mounting a bladder in an accumulator for use in various hydraulic apparatuses.

More particularly, it relates to a device for mounting a bladder of the type that upon mounting a bladder made of resilient material such as rubber and the like within an outer shell made of metal, a flange portion formed along the mouth of the bladder is engaged with the edge of an opening of said outer shell, and a lid is threadedly fitted on the flange portion by turning the same.

In the above-described type of mounting device for a bladder, since only the lid is turned under the state where the flange portion of the bladder is sandwitched between an engaging portion of the outer shell for the bladder and the lid to urge the flange portion of the bladder against the engaging portion of the outer shell, on the surface of the flange portion of the bladder in abutment with the lid is exerted a torque which tends to turn said flange portion together with the lid following the turn of said lid, while on the opposite surface, that is, on the surface of the flange portion in abutment with the engaging portion of the outer shell is exerted an opposite torque which tends to keep the flange portion stationary, due to frictional forces exerted between these three members.

Therefore, the flange portion is applied with a shearing stress along its surfaces, and so if the shearing stress exceeds a certain extent, the flange is deformed with resultant detrimental effect of the bladder. On the other hand, if the number of turns of the lid for thread engagement is too small, the urging force between the flange and the engaging portion of the outer shell becomes weak, which causes the gas filled within the outer shell to leak out through this engaging portion.

Thus it is a considerably critical problem to what extent the number of turns of the lid is to be increased.

One object of the present invention is to provide a novel mounting device for the bladder in said accumulator which is adapted to prevent a shearing stress from being applied to the flange portion when said flange portion of the bladder is urged against the engaging portion of the outer shell by turning the lid.

Another object of the present invention is to provide a novel mounting device for the bladder which is adapted to mount the flange portion of the bladder onto the outer shell in an air-tight manner.

Still another object of the present invention is to provide a novel mounting device for the bladder, in which when the bladder is deformed into a reduced size due to the urging force exerted by the pressured liquid contained in the outer shell, the portion of the bladder in the proximity of the flange portion may be bent with a substantial curvature to prevent damage of this portion.

The present invention provides the most appropriate improved means for achieving these objects, which comprises a bladder made of resilient material such as rubber and the like having a flange portion formed along the outer periphery of the mouth at its upper end, an outer shell having an engaging portion for engaging with the flange portion of said bladder and accomodating whole of said bladder therewithin, a centering ring member having an antifriction washer portion to be disposed on the upper end surface of the flange portion of the bladder, a cylindrical portion to be fitted into the inner periphery of the mouth of the bladder and an arcuated portion at the lower end of the cylindrical portion formed therein, and a lid having threads formed on its outer peripheral surface so as to be mated with threads formed on the inner peripheral surface of said outer shell at its upper end portion.

Figure 2:
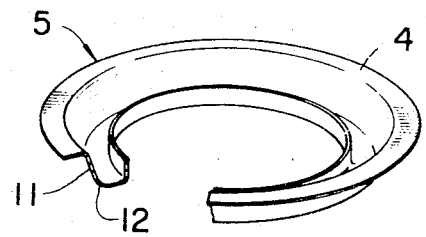

These and other objects and features of the present invention will be understood in more detail with reference to the following description taken in conjunction with the accompanying drawings, in which:

FIG. 1 is a longitudinal cross-section view showing an essential part of the device according to the present invention, FIG. 2 is a perspective view partly cut away of one component part in the device shown in FIG. 1, and FIGS. 3 through 5, respectively, are perspective views showing modified embodiments of the component part illustrated in FIG. 2.

In the drawings, reference numeral 1 designates an outer shell of an accumulator, and within said shell is accomodated a bladder 2 made of resilient material such as rubber and the like. Reference numeral 3 designates a flange portion of said bladder integrally formed along the outer periphery of the mouth of the same, and on the upper surface of said flange 3 is disposed an antifriction washer portion 4 of a centering ring member 5 consisting of the antifriction washer portion 4, a cylindrical portion 11 and an arcuated portion 12. Then the flange portion 3 is designed in such a manner that its outer diameter is somewhat larger than the outer diameter of the antifriction washer portion 4. A lid threadedly engaged with the opening of the outer shell 1 is shown at 1, a frictional engagement surface of the lid in contact with the antifriction washer portion 4 is shown at 7, and an air feed portion provided in the lid 6 is shown at 8.

Reference numeral 13 designates an engaging portion formed at the upper part of the inside of said outer shell 1 for engaging with a flange portion 3 of the bladder 2, numeral 14 designates a gap clearance inevitably formed between the inner periphery of the outer shell 1 and the outer periphery of the lid 6, numeral 15 designates threads formed on the outer shell 1, and numeral 16 designates threads formed on the lid 6.

In the mounting device according to the present invention, on the upper surface of the flange portion 3 is disposed the antifriction washer portion 4 of the centering ring member 5, the lid 6 being placed on said antifriction washer portion 4, and the flange portion 3 is urged against the engaging portion 13 of the outer shell 1 through the action of the threads 15 and 16 by turning the lid 16. Therefore, upon fastening the lid 6, even though the lid 6 is screwed, no torque is exerted upon the flange 3 because the frictional engagement surface 7 of the lid 6 smoothly slides along the upper surface of the antifriction washer portion 4, so that there is no risk that the flange portion 3 is twisted and damaged due to the screw fastening of the lid 6.

As the centering ring member 5 according to the present invention is provided with the antifriction washer portion 4 and the cylindrical portion 11, when the cylindrical portion 11 of the central ring member 5 is fitted into the mouth of the bladder 2 while the flange portion 3 of the bladder 2 is engaged with the engaging portion 13 of the outer shell 1, the center axis of the flange portion 3 of the bladder 2 made of soft resilient material and the center axis of the outer shell 1 can be readily aligned, and simultaneously therewith the distortion in shape of the mouth of the bladder 2 as well as the distortion in shape of the flange 3 can be easily corrected, and thereby the mounting of the bladder 2 onto the outer shell 1 may be achieved accurately in their relative position.

In addition, when the lid 6 has been threadedly engaged with the outer shell 1, the slight gap clearance 14 inevitably formed between the inner periphery of the outer shell 1 and the outer periphery of the lid 6, is blocked by a shoulder 9 of the flange portion 3 which has been squeezed out towards its outer periphery as compressed by the lid 6 and the centering ring member 5, whereby the air-tightness at this portion may be enhanced.

Still further, when the volume of the air within the bladder 2 has been largely contracted and thus the bladder 2 has deformed into the state as shown by a dot-dash line in FIG. 1, the bend portion 10 of the bladder 2 would bend along the arcuated portion 12 at the lower edge of the centering ring member 11, and thereby the local damage at this portion, which will be otherwise caused, can be prevented.

As described, since the bladder 2 can be mounted reliably to the outer shell 1, there is no risk that during the operation of the accumulator the bladder 2 is disengaged from the outer shell 1 or the gas within the bladder leaks out.

Figure 3:
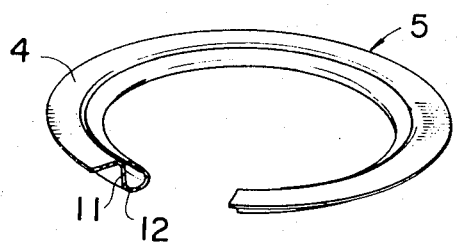
Figure 4:
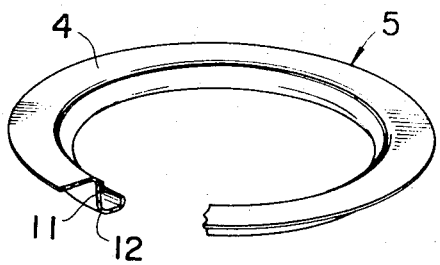
Figure 5:
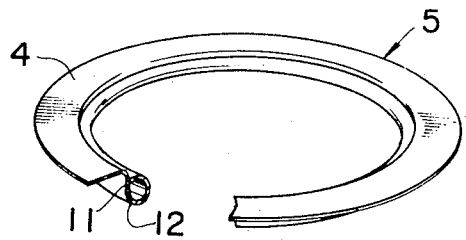

The centering ring members shown in FIGS. 3 through 5 are respectively different from the similar member illustrated in FIG. 2 with respect to the configuration of the arcuated portion 12 formed at the lower edge of the cylindrical portion 11, but all of these members achieve the same object as the arcuated portion 12 shown in FIG. 2. Also the structure of the remaining portion is exactly the same as the centering ring member shown in FIG. 2.

It is intended that the scope of the present invention should not be limited to the embodiments illustrated in the accompanying drawings but many changes and modifications of the illustrated embodiments could be made within the scope of the invention.

What is claimed is:

1. A device for mounting a bladder in an accumulator comprising a bladder made of resilient material such as rubber and the like, said bladder having a mouth and having a flange portion formed along the outer periphery of the mouth, an outer shell having an upper end portion and an engaging portion formed adjacent the upper end portion for engaging with the flange portion of said bladder and accommodating said bladder therein, a centering ring member having a cylindrical portion fitted into the inner periphery of the mouth of said bladder, an antifriction washer portion at the upper end of said cylindrical portion and an arcuated portion at the lower end portion of said cylindrical portion formed integrally therewith, the outer diameter of the flange portion of said bladder being larger than the outer diameter of said antifriction washer portion of said centering ring member, and a lid having threads formed thereon, and threads formed in said outer shell at its upper end portion, the threads of said lid mating with the threads of said outer shell at its upper end portion.

* * * * *